L. DINESEN.
MILKING APPARATUS.
APPLICATION FILED APR. 10, 1920.
1,417,505.
Patented May 30, 1922.
3 SHEETS—SHEET 2.
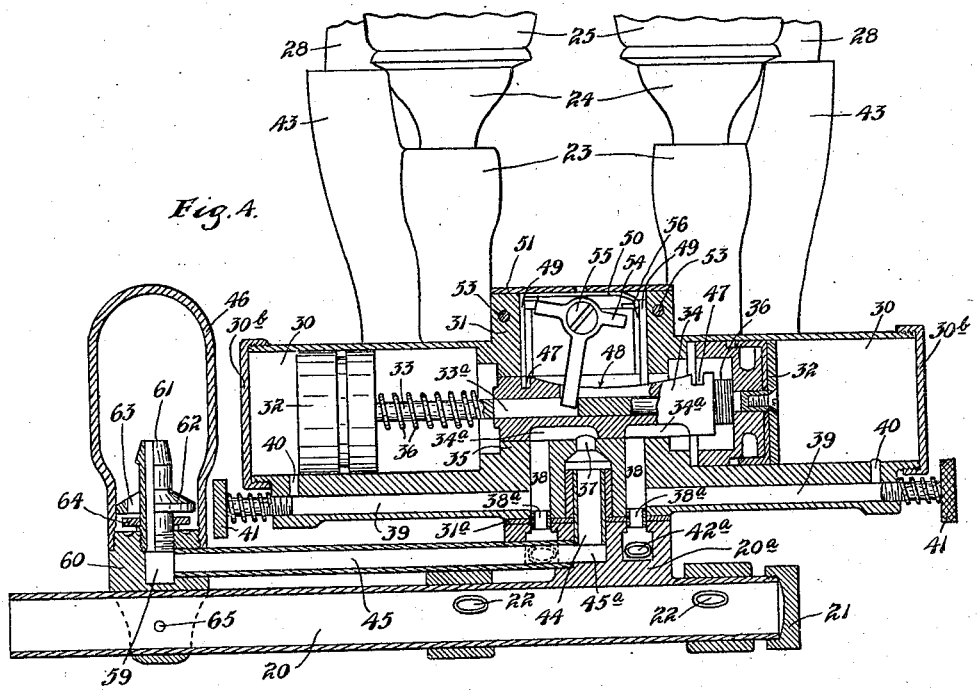
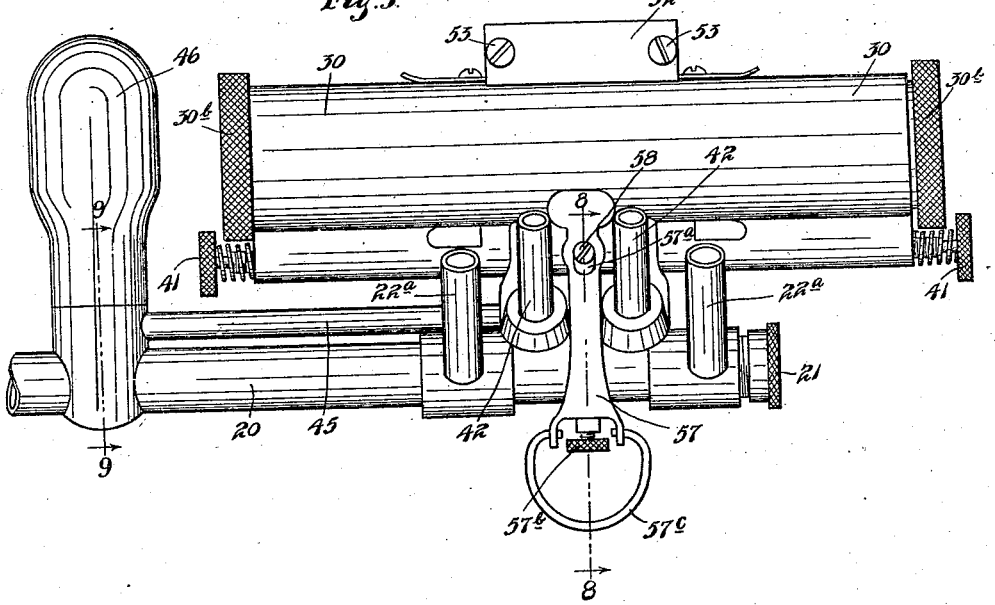
INVENTOR.
LAURITS DINESEN.
BY HIS ATTORNEYS.

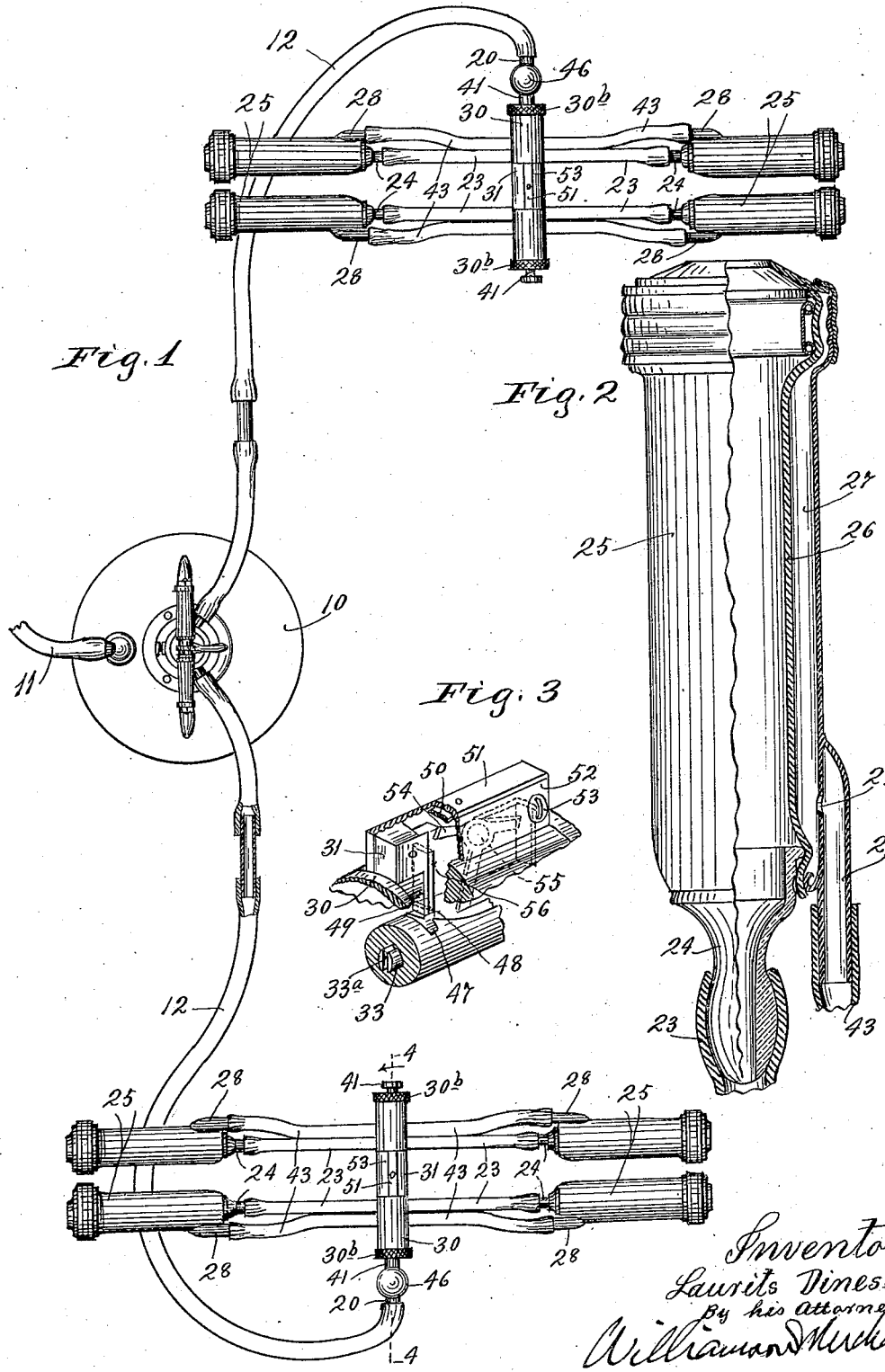

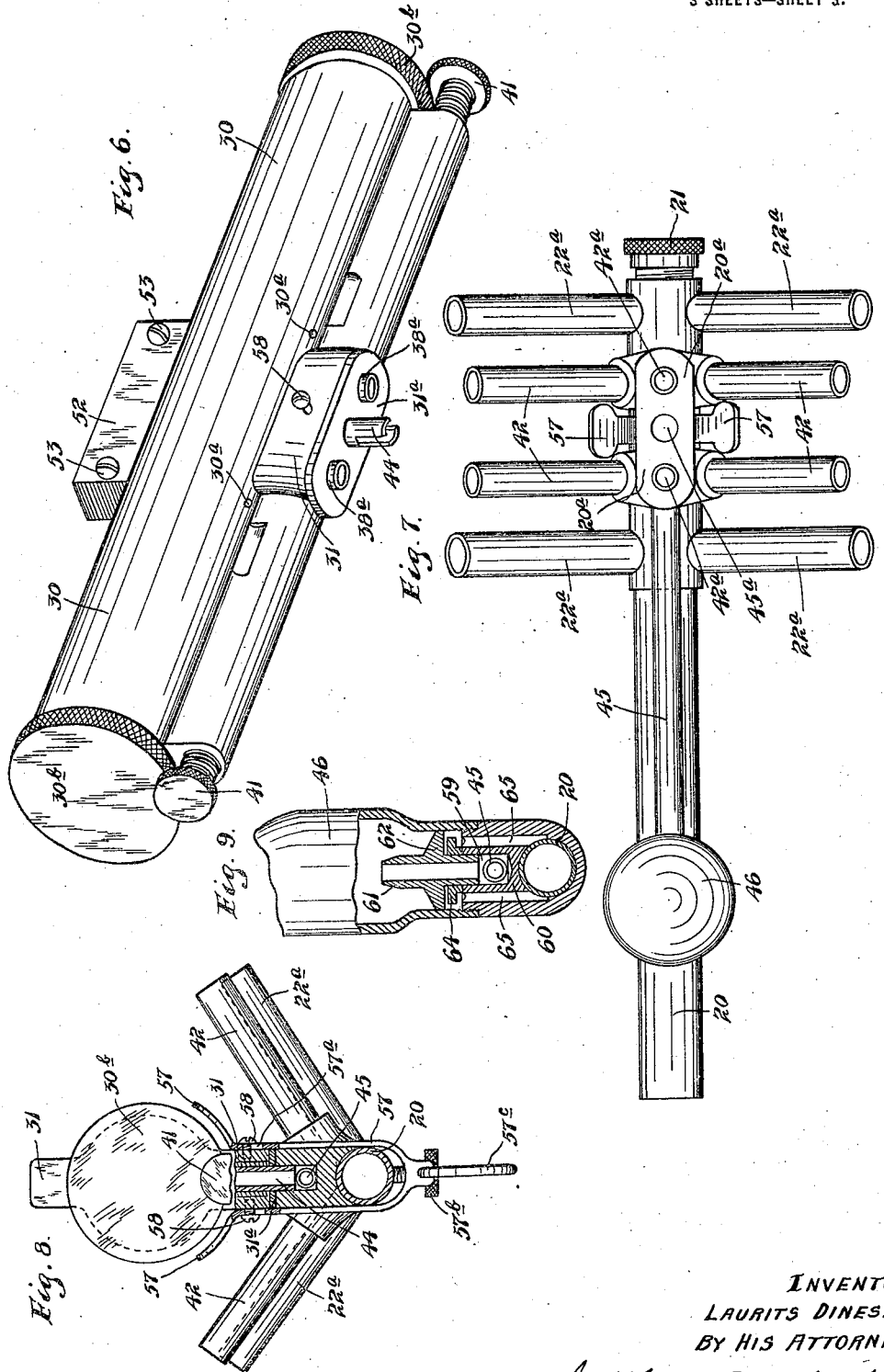

UNITED STATES PATENT OFFICE.

LAURITS DINESEN, OF MINNEAPOLIS, MINNESOTA, ASSIGNOR, BY MESNE ASSIGNMENTS, TO PERFECTION MANUFACTURING COMPANY, OF MINNEAPOLIS, MINNESOTA, A CORPORATION OF MINNESOTA.

MILKING APPARATUS.

1,417,505.  Specification of Letters Patent.  Patented May 30, 1922.

Application filed April 10, 1920. Serial No. 372,748.

*To all whom it may concern:*

Be it known that I, LAURITS DINESEN, a citizen of the United States, residing at Minneapolis, in the county of Hennepin and State of Minnesota, have invented certain new and useful Improvements in Milking Apparatus; and I do hereby declare the following to be a full, clear, and exact description of the invention, such as will enable others skilled in the art to which it appertains to make and use the same.

This invention relates to milking apparatus of the general character disclosed and claimed in my pending application S. N. 287,256, filed of date, April 3rd, 1919, and in my application S. N. 346,572, filed December 22nd, 1919.

In both of said pending applications, the apparatus illustrated employ double-chamber teat cups, that is, teat cups having inner and outer chambers separated by a flexible tubular wall; the pulsating mechanism, includes a vacuum motor located on the coupling head or claw, and hence, is at the receiving end of the milk tube; and the partial vacuum or suction for actuating the vacuum motor to produce the pulsations in the teat cups, is delivered through a single main tube that serves, both as a milk tube and the tube for rendering the partial vacuum or suction effective on the vacuum motor.

The present improved apparatus and the apparatus of my application S. N. 346,572, include a so-called equalizing vacuum chamber through which the suction, or partial vacuum in the milk tube is rendered effective in its operation on the vacuum motor and on the teat cups, and through which air intermittently admitted to the teat cups is delivered to the milk tube, that is, to the combined main tube.

The present improved apparatus is in the nature of an improvement on or refinement of the apparatus disclosed and claimed in said application, 346,572, and differs therefrom in certain important features which will be hereinafter described.

The invention is illustrated in the accompanying drawings wherein like characters indicate like parts throughout the several views.

Referring to the drawings:

Fig. 1 is a plan view illustrating the milking apparatus and showing what may be treated as a double-unit apparatus comprising one milk pail or receptacle and two groups of teat cups;

Fig. 2 is an enlarged view showing one of the teat cups partly in plan and partly in axial section;

Fig. 3 is a fragmentary perspective showing one of the lock dogs and associated parts of the pulsator mechanism;

Fig. 4 is an enlarged vertical section taken on the line 4—4 of Fig. 1;

Fig. 5 is a side elevation showing one of the coupling heads or claws and co-operating pulsation producing vacuum motor;

Fig. 6 is a perspective view showing the vacuum motor removed from the coupling head or claw;

Fig. 7 is a plan view of the coupling head or claw;

Fig. 8 is a section taken on the line 8—8 of Fig. 5, some parts being shown in full; and Fig. 9 is a section taken approximately on the line 9—9 of Fig. 5.

In this apparatus, I preferably employ a milk pail or receptacle 10 in which a partial vacuum is maintained by suitable means, such as an air tube 11 extended from a nipple on the pail cover and connected to a vacuum pump or vacuum tank not shown.

For each group of teat cups there is a single tube that serves as a combined milk tube and air tube 12. In the two-group arrangement shown in Fig. 1 there are, of course, two of the said tubes 12, and each is connected to the interior of the pail or receptacle 10 so that, during the operation of the apparatus, there will be partial vacuum or suction constantly maintained in the said milk tubes.

Each flexible milk tube 12, at its extended or receiving end, is connected to the tubular body 20 of a teat cup coupler head or claw. The extended end of the coupling tube 20 is closed by a cap 21 and said tube has four ports 22 that lead to corresponding nipples 22ª. These nipples 22ª are connected by short flexible branch milk tubes 23 to nipples 24 on the ends of the respective teat cups 25. These teat cups are preferably of the character disclosed and claimed in my prior Patent No. 1,201,808, of date, October 17, 1916, and the said cups are provided with tubular rubber inner walls or shells 26 that are collapsible and expansible and are spaced from the outer shells of the teat cups and afford annular air chambers 27. The air chambers 27 are connected to nipples 28 on the outer shells of the teat cups, through ports 29. The nipples 24 commingle with the chamber formed within the collapsible walls 26.

The common pulsator which controls the group of teat cups comprises axially aligned cylinders 30, rigidly secured to a centrally located metallic block 31, which, in turn, is connected, preferably detachably, to the coupling tube 20 in a manner which will be presently noted.

Working in the cylinders 30, are pistons 32 that are connected by an axial stem 33 passed through block 31. Mounted to slide on the intermediate portion of the piston rod 33, but held against rotation thereon, is a sleeve-like controller valve 34, which valve works through and is seated against the lower walls of the passage 35, formed in the block 31 concentric to the axis of piston rod 33. For an important purpose, coiled springs 36 placed around the end of the piston rod 33, are compressed between the respective pistons and the adjacent ends of the valve 34. Block 31 is provided with three ports 37 and 38—38, the two latter being connected by conduits 39 to ports 40, which latter open into the outer end portions of the cylinders 30. Choke valves 41 are applied to the cylinder castings adjacent to ports 40, to vary the cross section of the passage at those points and thus regulate the speed of movement of the piston, as will presently more clearly appear.

In my prior application S. N. 346,572, the air conduits 39 were connected to the nipples 28 of the respective teat cups through flexible tubes 43 connected to nipples rigidly secured in respect to the cylinder of the vacuum motor, but, as a feature of improvement in the present apparatus, these tubes 43 are connected to nipples 42 that are rigid on and projected from the coupling head or claw, so that the four nipples 42 are rigidly and permanently connected in respect to the four nipples $22^a$. More definitely stated, the nipples 42 lead to ports $42^a$ formed in a bearing block $20^a$ that is integral with or otherwise rigidly connected as a part of the tube 20. The ports $42^a$ open at the upper face of the block $20^a$ and the said block, between said ports $42^a$, is formed with an intermediate port $45^a$. The numeral 44 indicates a coupling sleeve that is rigidly set into the bottom of the cylinder block 31 and forms a downward extension of the intermediate port 37 thereof and the projecting lower end of this sleeve is adapted to telescope into the central port $45^a$ of the bearing block $20^a$. As shown in Fig. 6, the depending end of this sleeve 44 is bifurcated to prevent the same from closing the port $45^a$. The numeral $38^a$ indicates small sleeves that are rigidly set into the bottom of the cylinder block 31 and form slight downward extensions of the ports 38 and are adapted to telescope slightly into the ports $42^a$ of the block $20^a$. The sleeves $38^a$ serve to hold the cylinder 30 aligned with the coupling tube 20.

In Fig. 4, $31^a$ indicates a gasket of leather or other pliable material interposed between the imposing faces of the cylinder block 31 and bearing block $20^a$.

The interior of sleeve 44 does not open directly into tube 20 but is connected by the tube 45 that is indirectly connected to the tube 20 through the equalizing vacuum chamber 46 in a manner which will presently be described.

The controller valve 34, near its ends and on its upper portion, is provided with lock notches 47, and between these notches, is formed with a depressed cam surface 48. Mounted to slide vertically in the recessed upper portion of the block 31, is a pair of longitudinally spaced lock dogs 49, the lower ends of which, in a manner hereinafter described, co-operate with the respective lock notches 47 of the valve 34. At their upper ends, these dogs 49 are yieldingly pressed downward, as shown, by a leaf spring 50, seated against the top flange of an L-shaped plate 51. This plate 51 and a flat side plate 52, are detachably secured by screws or bolts 53 to upwardly projected longitudinally spaced portions of the block 31, so that the said elements 51 and 52 constitute the sides and top of the housing in which the dogs 49 and certain other parts, are mounted. For operating the dogs, I provide a three-armed lever 54, shown as pivoted by a stud 55 to an upright U-shaped plate 56. This plate 56 is rigidly secured to the depending flange of plate 51 and to the interior of the block 31, and its end flanges are spaced from the end lugs of said block, so as to afford guide channels for the dogs 49. At their upper ends, dogs 49 are provided with laterally projecting lips that rest on the ends of the upper arm of the lever 54. The depending arm of said lever 54 works through a clearance slot in the top of the valve 34, and projects into an elongated slot $33^a$ of the piston rod 33.

It is highly important to note that the controller valve 34 in its underside, is provided with two longitudinally spaced ports $34^a$. It will also be noted that cylinders 30, near their inner extremities, have ports $30^a$ that open to the atmosphere, and that the outer ends of said cylinders are closed by heads $30^b$.

For detachably holding the cylinder of the vacuum motor to the coupling head or claw made up of the tube 20 and bearing block 20ª, as shown in Figs. 4, 5 and 8, I provide an extremely simple and efficient device in the nature of a U-shaped spring coupling yoke 57. This coupling yoke embraces the tube 20 and block 20ª, between the longitudinally spaced air nipples 42, and in its prongs, it has elongated perforations 57ª adapting said prongs to be interlocked with the outstanding heads of studs or screws 58 that are rigidly secured to the opposite sides of the lower portion of the cylinder block 31. Working with threaded engagement through the crotch of the clamping yoke 57 is a clamping screw 57ᵇ, which, when tightened, presses against the bottom of the tube 20. As shown, a small wire hanger loop 57ᶜ is pivoted to ears on the lower portion of said coupling yoke 57.

The prongs of the coupling yoke 57, at their upper ends, are outwardly curved or projected to afford finger pieces by means of which the prongs may be pressed into interlocking engagement with the headed coupling screws 58. The tension of the prongs of said yoke will cause the prongs to spring out of engagement with the said screws 58 when the screw 57ᵇ is loosened so that the yoke may be raised far enough to force the perforations 57ª into complete alignment with the heads of said studs.

Attention is now called to the fact that the intermediate air port 45ª is connected by a tube 45 to the central chamber 59 of a block 60 that is rigidly secured to the tube 20 and rises above the same. This block 60, at its upper end, has a threaded boss on which the lower end of the equalizing chamber 46 is detachably but rigidly secured with an air-tight joint, by threaded engagement. Secured to and rising axially from the blocks 60 and forming an upward extension of the central cavity 59 is a nozzle tube 61 that has an outstanding annular flange 62 that extends to the surrounding walls of the lower portion of the equalizing chamber 46 and is provided with one or more vertical air passages 63. Mounted to slide on the tube 61 between the blocks 60 and flange 62 is an annular valve 64 that is normally held by gravity in a lowered position so as to leave ports or passages 63 open. The block 60, eccentric to its central chamber 59 is provided with one or more small air ducts 65 that lead to the interior of the tube 20.

*Operation.*

The operation of the apparatus is substantially as follows:—Constant partial vacuum will be maintained in the milk pail, and as stated, this, of course, will produce a partial vacuum or suction in the coupling tube 20, branch milk tubes 23, and in the inner chambers of the teat cups. In the position of the controller valve 34, shown in Fig. 4, left hand port 34ª connects central port 37 to left hand port 38, thus connecting the two left hand teat cups and the outer end of left hand cylinder 30 to tube 20, so that at this time, air will be drawn from the said outer chambers of the two left hand teat cups into the said tube 20, and from thence, through the common milk tube 12 into the milk pail; and at the same time, right hand port 34ª connects right hand port 38 to the atmosphere through the inner end of right hand cylinder and right hand port 30ª. This opening of right hand port 38 allows air to rush into right hand tube 39 and from thence through the right hand air tubes 43 into the outer annular chambers 27 of the right hand teat cups, thereby contracting the tubes of the said two teat cups, and producing a squeezing action that closely approximates that produced in the hand milking action.

In the position of the parts just described and shown in Fig. 4, the left hand lock dog 49 has just been lifted out of the left hand notch 47, so that right hand spring 36, which is then compressed, will immediately throw the said valve 34 toward the left to a position in which right hand dog 49 will engage right hand notch 47, and then temporarily lock said valve 34 in a position in which the relation of parts just described, will be reversed, that is, to a position in which right hand ports 34ª will connect intermediate port 37 to right hand port 38, and left hand port 34ª will connect left hand port 38 to the atmosphere through left hand atmospheric port 30ª. In this last noted position of the said valve 34, the annular air chambers of the two right hand teat cups will then be connected to tube 20 through chamber 46 and thus subjected to partial vacuum, which will be effective on the flexible inner casing 26, and at the same time, outer end of the left hand cylinder 30 and the annular chambers of the two left hand teat cups will be connected to the atmosphere. In the above description, it is assumed that the left hand air tube 39 is connected to two teat cups located on one side, and that the right hand air tube 39 is connected to two teat cups located on the other side, but, of course the said teat cups may be cross connected, if desired.

When the outer end of left hand cylinder 30 is open to the atmosphere and the outer end of the right hand cylinder 30 is subjected to partial vacuum as just described, the pistons will be simultaneously moved toward the right, but the controller valve 37 will be held stationary by the right hand dog 49, while the left hand spring 35 is being compressed, and until left hand extremity of piston rod slot 33ª strikes the lower end of the depending arm of lever 54, and thereby causes the upper right hand arm of said lever to lift said right hand dog out of right hand notch 47, thereby again freeing the said controller valve 34, and permitting the same to be quickly moved toward the right by the action of the compressed left hand spring 35. As valve 34 reaches the limit of its movement toward the right, the cam surface 35 of said valve, acting on left hand dog 49, will lift the same and then allow the said left hand dog to engage left hand notch 47 and again temporarily lock the said valve against return movement.

At the time when the compressed spring 36 is released to move valve 34, as above described, air pressure will be effective on one or the other of the pistons to prevent a return movement of the piston, but as soon as the valve has been moved far enough to partly open the ports, as above described, the air pressure on the piston will be released and trouble might ensue were it not for the fact that the friction between the pistons and the cylinders exceeds the friction between the controller valve 34 and its seat, so that the said pistons still afford a base of re-action for the compressed spring insuring the completion of the movement of the valve to complete port opening position.

When the piston is moved, as above described, in either direction, the air in the end of the cylinder against which the piston is being moved will be drawn through the corresponding air conduit 39, connected ports 38, 34ª, 37, sleeve 44, air tube 45, and equalizing chamber 46 and certain other parts noted and presently more fully described, into the milk tube 20 where the air will be commingled with the milk and will be drawn with the milk through the common milk tube 12 into the pail. The air thus drawn also hastens the flow of the milk to the pail.

The important action of the so-called equalizing vacuum chamber 46 will now be further considered, and it should first be noted that the conducting capacity of the air duct or ducts 65, as well as of ports 63 in flange 62, are considerably less than the conducting capacity of the nozzle tubes 61 and other connections between the same and the conduits 39, so that when air is admitted to the equalizing chambers, as above described, the equalization of the vacuum in chamber 46 with that in milk tube 20 will be retarded, that is, will not take place quickly. Therefore, the air will flow uniformly, or nearly so, from the teat cups to the milk tube 20 and there will be no shocks such as would be produced by sudden intermittent flow of air into the milk tube. Moreover, the partial vacuum in the equalizing chamber 46 will be kept lower, or slightly less intense, and in this way, there is maintained in the outer chambers of the teat cups a little greater pressure than in the inner chambers. This is important, because it prevents the rubber tubes or elastic members 26 of the teat cups from expanding too much, or, in other words, from moving away from the teats to an extent that will entirely release them from the teats. Otherwise stated, while the desired pulsation is produced, the flexible walls of the teat cups, even when expanded, will have sufficient gripping action on the teats to prevent accidental dropping of the cups from position.

What I claim is:

1. In a milking apparatus, a main line tube, a coupling head connected to the extended end of said tube and provided with milk intake ports and with air intake ports, of a group of teat cups, milk and air tubes connecting said teat cups, respectively, to the milk and air intake ports of said coupler head, and a pulsator mechanism comprising a vacuum motor detachably secured to said coupler head and having ports alignable with the air intake ports of the latter.

2. In a milking apparatus, a main line tube, a coupling head connected to the extended end of said tube and provided with milk intake ports and with air intake ports, of a group of teat cups, milk and air tubes connecting said teat cups, respectively, to the milk and air intake ports of said coupler head, and a pulsator mechanism comprising a vacuum motor detachably secured to said coupler head and having ports alignable with the air intake ports of the latter, the aligned ports of said coupler head and vacuum motor being at offset points and having telescoping parts that hold said motor and coupler head aligned.

3. In a milking apparatus, a main line tube, a coupling head connected to the extended end of said tube and provided with milk intake ports and with air intake ports, of a group of teat cups, milk and air tubes connecting said teat cups, respectively, to the milk and air intake ports of said coupler head, a pulsator mechanism comprising a vacuum motor detachably secured to said coupler head and having ports alignable with the air intake ports of the latter, and means for rigidly but detachably connecting said motor to said coupling head, comprising a spring yoke arranged to embrace said coupler head and having interlocking engagement with said motor.

4. In a milking apparatus, a main line tube, a coupling head connected to the extended end of said tube and provided with milk intake ports and with air intake ports, of a group of teat cups, milk and air tubes connecting said teat cups, respectively, to the milk and air intake ports of said coupler head, and a pulsator mechanism comprising a vacuum motor detachably secured to said coupler head and having ports alignable with the air intake ports of the latter, the aligned ports of said coupler head and vacuum motor being at offset points and having telescoping parts that hold said motor and coupler head aligned, and means for rigidly but detachably connecting said motor to said coupling head, comprising a spring yoke arranged to embrace said coupler head and having interlocking engagement with said motor.

5. In a milking apparatus, the combination with a coupler head having four rigidly secured outstanding milk conducting nipples and four rigidly secured outstanding air conducting nipples, of groups of two chambered teat cups, tubes connecting the inner chambers of said teat cups to said milk conducting nipples, tubes connecting the outer chambers of said teat cups to said air conducting nipples, and a pulsator mechanism comprising a vacuum motor, a cylinder and piston vacuum motor, the cylinder thereof and said coupling head having opposing flat bearing faces equipped with alignable air ports through which air is intermittently admitted to the opposite ends of the motor cylinder and to the outer chambers of said teat cups, and means for detachably securing said motor to said coupling head.

6. In a milking apparatus, the combination with a milk receptacle and a main combined milk and air tube extended therefrom, of a coupler head connected to the extended end of said main tube and provided with milk conducting nipples and air conducting nipples projecting therefrom, a group of two-chambered teat cups, milk tubes extended from the inner chambers of said teat cups to said milk conducting nipples, air tubes connecting the outer chambers of said teat cups to said air conducting nipples, an equalizing chamber located on said coupling head and having a port for the delivery of air therethrough, a vacuum motor detachably connected to said coupling head, said coupling head and the motor having opposing faces and, in said opposing faces, having intermediate and outer air ports arranged to be alternately connected by said motor, said intermediate port being connected to said equalizing chamber and said outer ports being connected to different members of said air conducting nipples.

7. In a milking apparatus, the combination with a milk receptacle and a main combined milk and air tube extended therefrom, a coupler head connected to the extended end of said main tube and provided with four milk conducting nipples and four air conducting nipples projecting therefrom, two groups of two-chambered teat cups, milk tubes connecting the inner chambers of said teat cups to said milk conducting nipples, air tubes connecting the outer chambers of said teat cups and said air conducting nipples, an equalizing chamber located on said coupler head and having a port for the delivery of air thereto, a vacuum motor detachably connected to said coupling head, said motor and said head having opposing bearing faces, means for securing said motor to said coupling head, said coupling head and motor, in their opposing faces, having intermediate and outer air ports arranged to be alternately connected by said motor, said intermediate port being connected to said equalizing chamber and said outer ports being connected to different members of said air conducting nipples.

8. In a milking apparatus, the combination with a milk receptacle and a main combined milk and air tube extended therefrom, of a coupler head connected to the extended end of said main tube and provided with milk conducting nipples and air conducting nipples projecting therefrom, a group of two-chambered teat cups, milk tubes extended from the inner chambers of said teat cups to said milk conducting nipples, air tubes connecting the outer chambers of said teat cups to said air conducting nipples, an equalizing chamber located on said coupling head and having a port for the delivery of air therethrough, a vacuum motor detachably connected to said coupling head, said coupling head and the motor having opposing faces and, in said opposing faces, having intermediate and outer air ports arranged to be alternately connected by said motor, said intermediate port being connected to said equalizing chamber and said outer ports being connected to different members of said air conducting nipples, the co-operating intermediate and outer ports of said coupling head and motor having telescoping parts that align said motor with said head.

In testimony whereof I affix my signature.

LAURITS DINESEN.